(12) United States Patent
Kajikawa (10) Patent No.: US 8,425,335 B2
(45) Date of Patent: Apr. 23, 2013

(54) TORQUE TRANSMISSION DEVICE

(75) Inventor: Yasushi Kajikawa, Kitakatsuragi-gun (JP)

(73) Assignee: JTEKT Corporation, Osaka (JP)

( * ) Notice: Subject to any disclaimer, the term of this patent is extended or adjusted under 35 U.S.C. 154(b) by 78 days.

(21) Appl. No.: 13/170,783

(22) Filed: Jun. 28, 2011

(65) Prior Publication Data
US 2012/0010006 A1 Jan. 12, 2012

(30) Foreign Application Priority Data
Jul. 6, 2010 (JP) ................................ 2010-154151

(51) Int. Cl.
*F16C 3/03* (2006.01)

(52) U.S. Cl.
USPC .......................................... 464/162; 277/912

(58) Field of Classification Search .................. 464/162, 464/172; 180/384; 277/412, 559, 912
See application file for complete search history.

(56) References Cited

U.S. PATENT DOCUMENTS 2,064,392 A * 12/1936 Swenson et al. .......... 464/172 X
2,116,290 A *  5/1938 Spicer ........................... 464/162
6,722,990 B2 *  4/2004 Duggan

FOREIGN PATENT DOCUMENTS

JP    U-62-110628    7/1987

* cited by examiner

*Primary Examiner* — Gregory Binda
(74) *Attorney, Agent, or Firm* — Oliff & Berridge, PLC (57) ABSTRACT

A torque transmission device includes: a first cover that has a cylindrical shape and that is attached to a shaft and covers an outer periphery of a sleeve; a second cover that has a cylindrical shape and that is attached to the sleeve and covers an outer periphery of the first cover; a seal that fills an annular space between the first cover and the sleeve; and a ring that is installed in a circumferentially continuous groove formed in one of an outer peripheral surface of the first cover and an inner peripheral surface of the second cover, and that is slidable on the other one of the outer peripheral surface of the first cover and the inner peripheral surface of the second cover. A labyrinth seal is constructed between the ring and the groove.

12 Claims, 7 Drawing Sheets

TORQUE TRANSMISSION DEVICE

INCORPORATION BY REFERENCE

The disclosure of Japanese Patent Application No. 2010-154151 filed on Jul. 7, 2010 including the specification, drawings and abstract is incorporated herein by reference in its entirety.

BACKGROUND OF THE INVENTION

1. Field of the Invention

The present invention relates to a torque transmission device.

2. Description of Related Art

Figure 6:
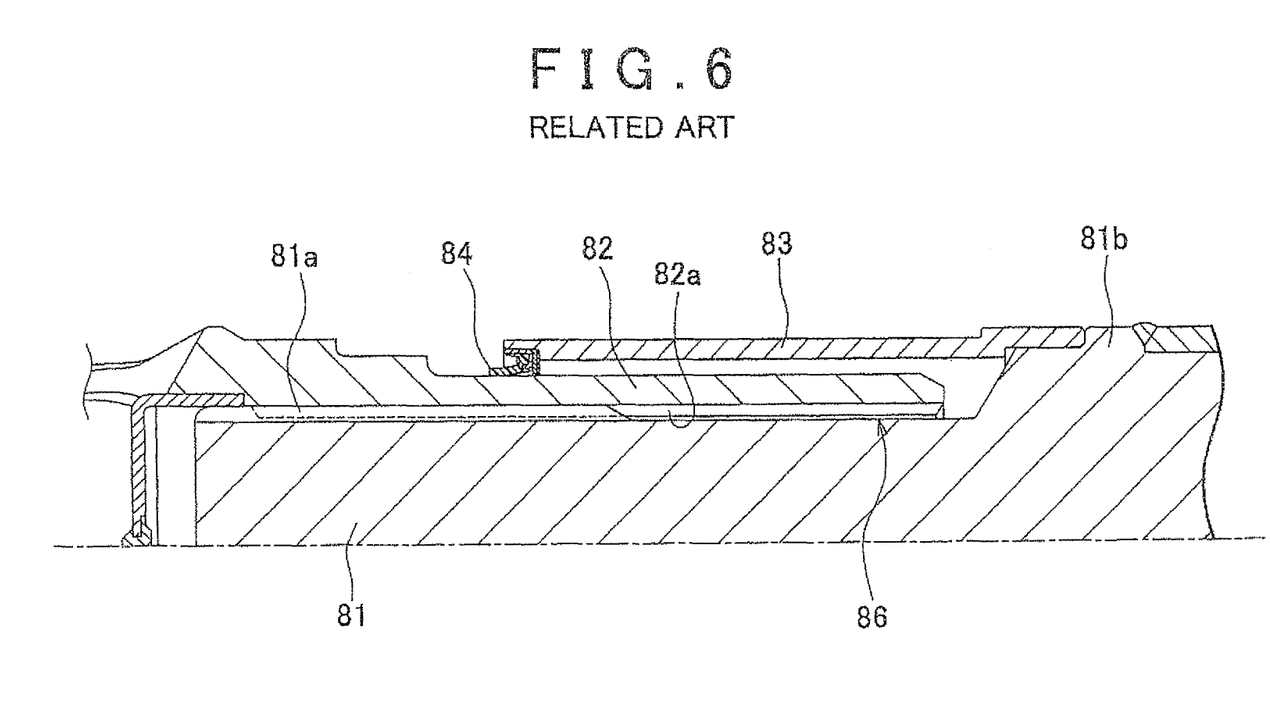
FIG. 6 is a vertical cross-sectional view illustrating a torque transmission device according to the related art.

The torque transmission device used in a joint of a propeller shaft provided in a vehicle is, for example, disclosed in Japanese Patent Application Publication No. 62-110628 (JP-U-62-110628). This torque transmission device includes, as shown in FIG. 6: a shaft 81 that has a male spline 81a in a part of an outer periphery; a sleeve 82 that has a female spline 82a fitted to the male spline 81a in a part of an inner periphery; a cylindrical cover 83 that is attached to a base portion 81b of the shaft 81 and covers an outer pheriphry of the sleeve 82; and a seal 84 that has a rubber seal lip for sealing an annular space formed between the cover 83 and the sleeve 82. In this torque transmission device, the shaft 81 and the sleeve 82 are incapable of relative rotation in a circumferential direction, but capable of relative movement in an axial direction, by means of the male spline 81a and the female spline 82a.

When, specifically, the torque transmission device is used as a joint of a propeller shaft, an incoming obstacle from road (such as a small stone) may hit the seal 84, and therefore it may cause the breakage of the seal 84. For this reason, a structure as shown in FIG. 7 has been proposed such that a second cover 85 that has a cylindrical shape and that coves the seal 84 as well as the cover (first cover) 83 from radially outside is attached to the sleeve 82.

Figure 7:
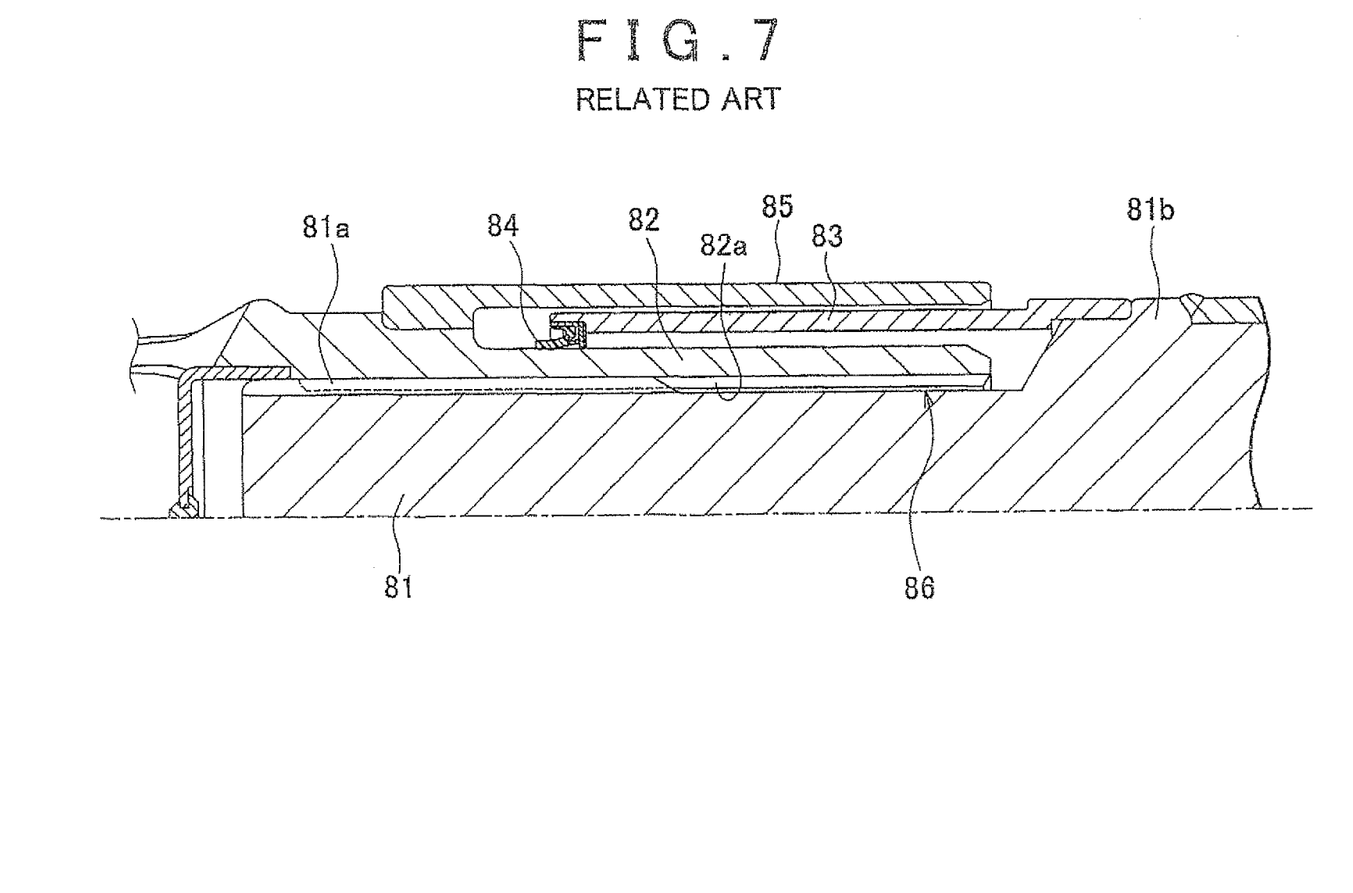
FIG. 7 is a vertical cross-sectional view illustrating a torque transmission device according to the related art.

According to the structure of FIG. 7, although the related art can protect the seal 84 from hitting by the incoming obstacle from the outside, the obstacle such as mud and small dirt may get in the inside where the seal 84 is provided through a gap between an inner peripheral surface of the second cover 85 and an outer peripheral surface of the first cover 83. In this case, although the seal 84 with the rubber seal lip prevents the obstacle from entering in a spline portion 86, the obstacle may accumulate in the vicinity of the seal 84, and the accumulated obstacles may eventually cause the breakage and deterioration of the seal 84.

Therefore, a structure is conceived such that, besides the seal 84 (first seal), the second seal having the same rubber seal lip as the first seal 84 is provided between the outer peripheral surface of the first cover 83 and the inner peripheral surface of the second cover. However, in the structure that is provided with the seal, when the shaft 81 and the sleeve 82 relatively move in the axial direction, the volume of the sealed space that is formed between the first seal 84 and the second seal may vary, and the space may be subjected to negative pressure. In this case, due to a pumping action based on the negative pressure, lubricant in the spline portion 86 may be drawn to the annular space between the sleeve 82 and the first cover 83 or sucked outside over the seal 84. Thus, lubricant shortage in the spline portion 86 may occur.

SUMMARY OF THE INVENTION

The present invention provides a torque transmission device that is capable of preventing the entry of obstacles from the outside to the inside, and that does not produce negative pressure inside when the shaft and the sleeve relatively move in the axial direction.

A first aspect of the invention relates to a torque transmission device including: a shaft that has a male spline on a part of an outer periphery thereof; a sleeve that has a female spline fitted to the male spline on a part of an inner periphery thereof and that is incapable of relative rotation about the shaft and capable of relative movement in an axial direction; a first cover that has a cylindrical shape and that is attached to the shaft and covers an outer periphery of the sleeve; a second cover that has a cylindrical shape and that is attached to the sleeve and covers an outer periphery of the first cover; and a seal that fills an annular space between the first cover and the sleeve. The torque transmission device further includes: a ring that is installed in a circumferentially continuous groove formed in one of an outer peripheral surface of the first cover and an inner peripheral surface of the second cover, and that is slidable on the other one of the outer peripheral surface of the first cover and the inner peripheral surface of the second cover. A labyrinth seal is constructed between the ring and the groove.

According to the above aspect, a labyrinth seal is constructed between the outer peripheral surface of the first cover and the inner peripheral surface of the second cover by the ring and the groove. Therefore, the entry of obstacles from the outside to the side of the seal can be prevented. The ring mounted in the groove formed in one side of the outer peripheral surface of the first cover and the inner peripheral surface of the second cover is slidable on the other side surface of the outer peripheral surface of the first cover and the inner peripheral surface of the second cover, and therefore the ring does not interrupt the relative axial movement between the first cover and the second cover or the relative axial movement between the shaft and the sleeve.

In the labyrinth seal, air can pass through the gap that is formed between the ring and the groove. Therefore, when the shaft and the sleeve relatively move in the axial direction, negative pressure, which can be produced in the related art, is not produced inside. That is, the device according to the present invention permits the passage of air but regulates the passage of obstacles such as mud between the first cover and the second cover.

According to the above aspect, the passage of air is permitted, but the passage of obstacles such as mud can be regulated between the first cover and the second cover. Therefore, the entry of obstacles from the outside can be prevented, and negative pressure, which can be produced in the related art, is not produced inside when the shaft and the sleeve relatively move in the axial direction. As a result, it is possible to prevent, for example, that lubricant in the spline is sucked outside.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
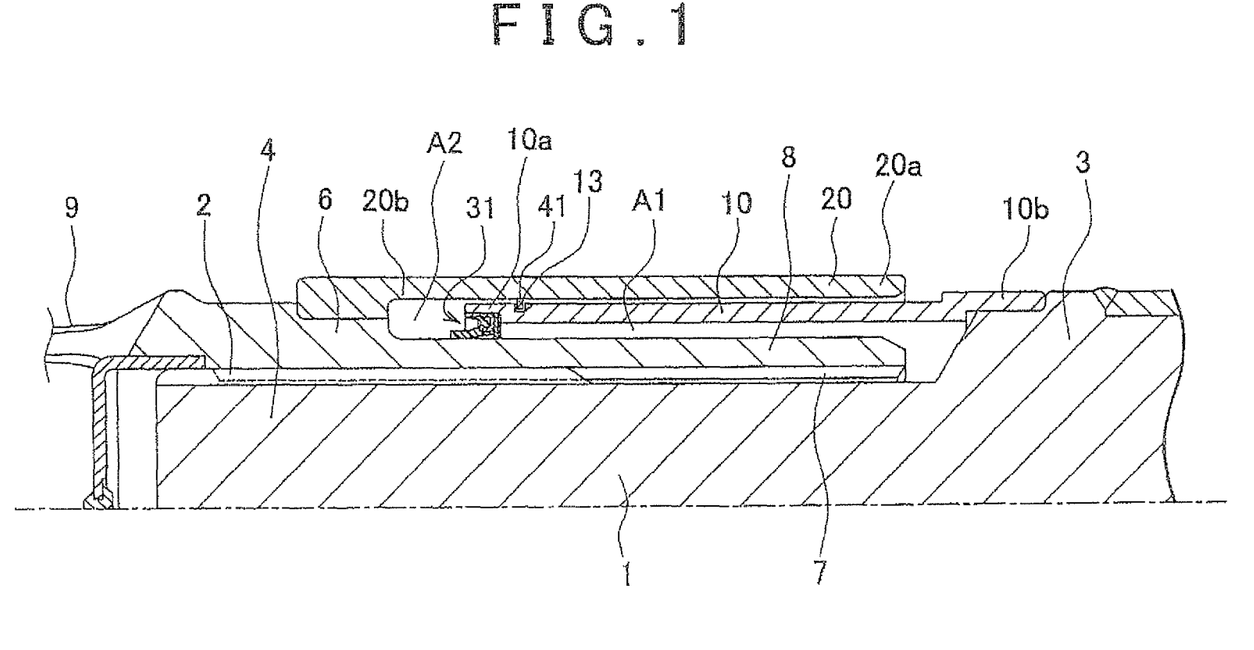
FIG. 1 is a vertical cross-sectional view illustrating a torque transmission device according to the first embodiment of the present invention and shows an upper half of the torque transmission device.

The first embodiment of the present invention is described hereinafter with reference to the attached drawings. FIG. 1 is a vertical cross-sectional view illustrating a torque transmission device according to the first embodiment of the present invention and shows an upper half of the torque transmission device. The torque transmission device of this embodiment may be applicable to a joint of the propeller shaft of the vehicle. The torque transmission device of FIG. 1 includes a shaft 1 that has a male spline 2 on a part of the outer periphery, and a sleeve 6 that has a female spline 7 fitted to the male spline 2 on a part of the inner periphery. By means of the splines 2 and 7, the shaft 1 and the sleeve 6 are incapable of relative rotation, but capable of mutual torque transmission and further relative movement in the axial direction, so that the total length of the device including the shaft 1 and the sleeve 6 may be expanded and contracted. FIG. 1 shows the most contracted state of the device.

The shaft 1 mentioned above has a shaft body 4 on which the male spline 2 is formed and a base portion 3 that has a larger diameter than the shaft body 4. The shaft body 4 extends in an axial direction from the base portion 3 (to the left side in the axial direction, in this embodiment). The base portion 3 and the shaft body 4 are formed as one-piece. The sleeve 6 mentioned above has a base portion 9 and a cylindrical portion 8 on which the female spline 7 is formed. The cylindrical portion 8 extends in an axial direction from the base portion 9 (to the right side in the axial direction, in this embodiment). The base portion 9 and the cylindrical portion 8 are formed as one-piece.

In FIG. 1, the torque transmission device also includes a first cover 10 that has a straight cylindrical shape and that covers an outer pherphly of the cylindrical portion 8 of the sleeve 6, and a second cover 20 that has a straight cylindrical shape and that covers an outer pherphly of the first cover 10. All of the shaft 1, sleeve 6, the first cover 10, and the second cover 20 have circular cross sections and are arranged concentrically.

The first cover 10 mentioned above is fixed to the base portion 3 of the shaft 1 at one end (at a right base portion 10b in FIG. 1). An annular space is formed between the first cover 10 and the shaft body 4 of the shaft 1 such that the side of the fitting portion (base portion 10b) of the first cover 10 is closed. The second cover 20 mentioned above is fixed to the cylindrical portion 8 of the sleeve 6 at one end (at a left base portion 20b in FIG. 1). An annular space is formed between the second cover 20 and the cylindrical portion 8 of the sleeve 6 such that the side of the fitting portion (base portion 20b) of the second cover 20 is closed.

Figure 2:
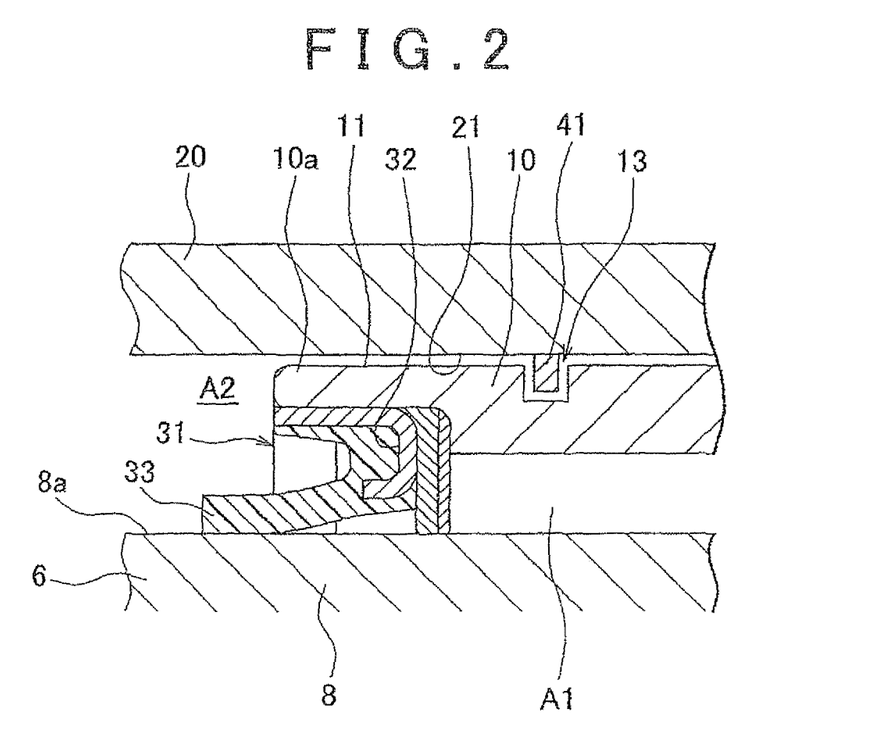
FIG. 2 is an enlarged cross-sectional view illustrating a seal and a ring.

Furthermore, the torque transmission device is provided with a seal 31 that seals the annular space A1 between the first cover 10 and the cylindrical portion 8 of the sleeve 6. FIG. 2 is an enlarged cross-sectional view illustrating the seal 31 and a ring 41 described below. The seal 31 has a body portion 32 that is fixed to the first cover 10 and a seal lip 33 that extends from the body portion 32 to an outer peripheral surface 8a of the cylindrical portion 8 of the sleeve 6. The seal lip 33 is made of rubber, for example. Referring to FIGS. 1 and 2, when the shaft 1 and the sleeve 6 relatively move in an axial direction, the sleeve 6 and the first cover 10 fixed to the shaft 1 relatively move in the axial direction. In this case, the seal lip 33 slides on an outer peripheral surface 8a of the cylindrical portion 8 of the sleeve 6.

The seal 31 is mounted to a tip 10a of the first covert 10 and seals the annular space A1 formed between the first cover 10 and the cylindrical portion 8 at the side of the tip 10a. That is, in FIG. 1, the seal 31 divides, along with the first cover 10, a radial inward space of the second cover 20 into the annular space A1 as the inner side and an annular space A2 as the outer side. Here, the annular space A1 is a space that is formed between the first cover 10 and the cylindrical portion 8 of the sleeve 6, and the annular space A2 is a space that is formed at the side between the base portion 20b of the second cover 20 and the base portion of the cylindrical portion 8 of the sleeve 6. When the whole device is expanded or contracted, the seal 31 is in a covered state from the radial outward by the second cover 20 throughout a stroke length of the device.

As shown in FIG. 2, a circumferentially continuous groove 13 is formed in an outer peripheral surface 11 of the first cover 10. This groove 13 is continuously formed throughout the perimeter of the outer peripheral surface 11 as an annular groove. The ring 41 is arranged within the groove 13. While the ring 41 has an annular shape, this embodiment employs a C-shaped ring in order to facilitate the installation of the ring to the groove 13.

Figure 3:
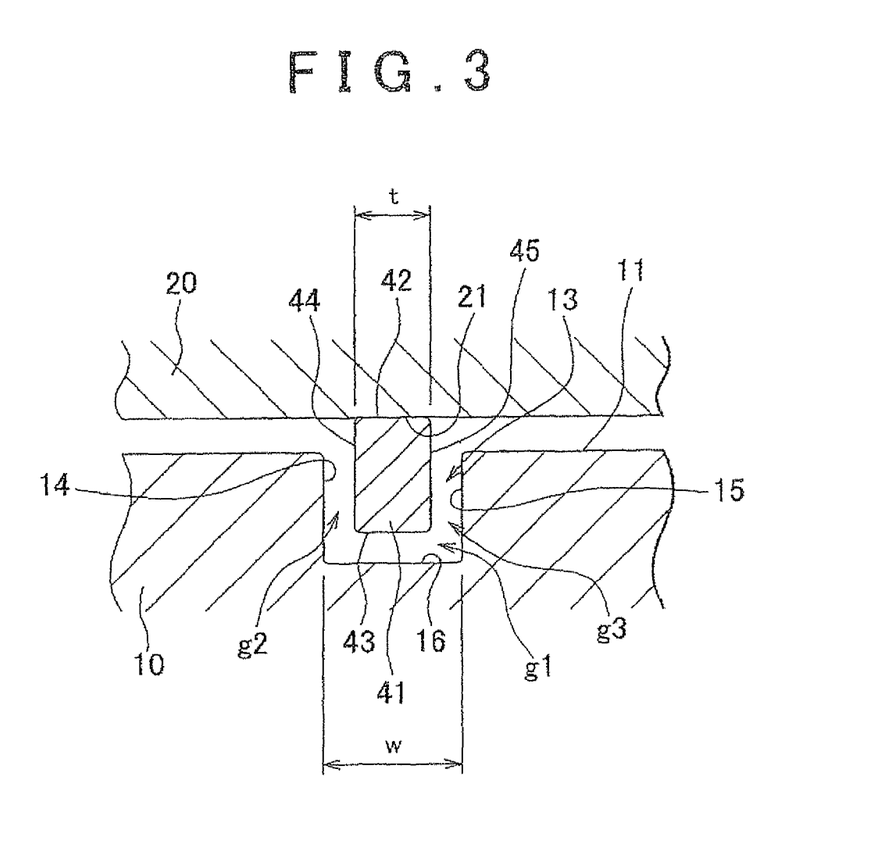
FIG. 3 is a cross-sectional view illustrating a ring and a groove.

FIG. 3 is a cross-sectional view illustrating the ring 41 and the groove 13. The ring 41 is arranged between side surfaces 14 and 15 that are located on both sides in the axial direction of the groove 13 that is formed in the first cover 10. However, the ring 41 is not fixed to the first cover 10 and is movable inside the groove 13 in the axial direction. An outer peripheral surface 42 of the ring 41 closely contacts an inner peripheral surface 21 of the second cover 20. That is, the ring 41 is being urged against the inner peripheral surface 21 of the second cover 20. Therefore, when the shaft 1 and the sleeve 6 relatively move in the axial direction, the first cover 10 and the second cover 20 relatively move in the axial direction also, and thus the ring 41 fitted inside the groove 13 formed in the first cover 10 is pushed to one of the side surfaces 14 and 15 of the groove 13 and slides on the inner peripheral surface 21 of the second cover 20.

As shown in FIG. 3, the ring 41 has an axial thickness t that is smaller than a width dimension w of the groove 13 (w>t). In addition, the ring 41 has a gap g1 with a bottom surface 16 of the groove 13 and is disposed between the side surfaces 14 and 15 of the groove 13. By the ring 41 and the groove 13, a labyrinth seal (labyrinth structure) is constructed between the outer peripheral surface 11 of the first cover 10 and the inner peripheral surface 21 of the second cover 20. The labyrinth seal is capable of preventing the entry of obstacles from an opening of a tip 20a of the second cover 20 (see FIG. 1) to the seal 31.

The ring 41 mounted in the groove 13 may be slidable on the inner peripheral surface 21 of the second cover 20 and therefore may not interrupt the relative axial movement between the first cover 10 and the second cover 20 or the relative axial movement between the shaft 1 and the sleeve 6.

In this labyrinth seal, the gap g1 is formed between an inner peripheral surface 43 of the ring 41 and the bottom surface 16 of the groove 13, and gaps g2 and g3 may be formed between side surfaces 44 and 45 of the ring 41 and the side surfaces 14 and 15 of the groove 13, respectively. Air can pass through the gaps g1, g2, and g3. Therefore, assuming that the labyrinth seal formed by the ring 41 and the groove 13 is a second seal, when the shaft 1 and the sleeve 6 relatively move in the axial direction, negative pressure is not produced in a space between the second seal and the seal 31 (first seal).

As a result, in FIG. 1, lubricant, for example, that exists in the mating portion of the male spline 2 with the female spline 7 may not be drawn to the annular space A1 between the cylindrical portion 8 of the sleeve 6 and the first cover 10 or sucked out to the annular space A2 formed on the side of the base portion 20b of the second cover 20 over the seal 31, by the negative pressure. Therefore, lubricant shortage in the mating portion of the splines 2 and 7 can be prevented.

The labyrinth seal formed by the ring 41 and groove 13 as described above can permit the passage of air but regulate the passage of obstacles such as mud between the first cover 10 and the second cover 20. In order to prevent the entry of obstacles, each of the gaps g1, g2, and g3 may be set to the size smaller than the gap that is formed between the outer peripheral surface 11 of the first cover 10 and the inner peripheral surface 21 of the second cover 20.

As described above, when the shaft 1 and the sleeve 6 relatively move in the axial direction, the ring 41 fitted inside the groove 13 formed in the first cover 10 is pushed to one of the side surfaces 14 and 15 of the groove 13 and slides on the inner peripheral surface 21 of the second cover 20. In this case, one of the side surfaces 44 and 45 of the ring 41 is in contact with one of the side surfaces 14 and 15 of the groove 13; however, the ring 41 is a C-shaped ring and therefore does not have airtightness between the contacting side surfaces, so that the passage of air is permitted. In order to reduce the airtightness between the side surfaces, rough surface processing may be applied to one or both of the side surfaces 14 and 15 of the groove 13 and the side surfaces 44 and 45 of the ring 41. Or, one or more projections may be provided in one or both of the side surfaces 14 and 15 of the groove 13 and the side surfaces 44 and 45 of the ring 41. Separating portions of the ring 41 formed in C-shape may be misaligned in the axial direction. Furthermore, a notch may be formed on the outer peripheral surface of the ring 41 in order to reduce the airtightness.

Figure 4A:
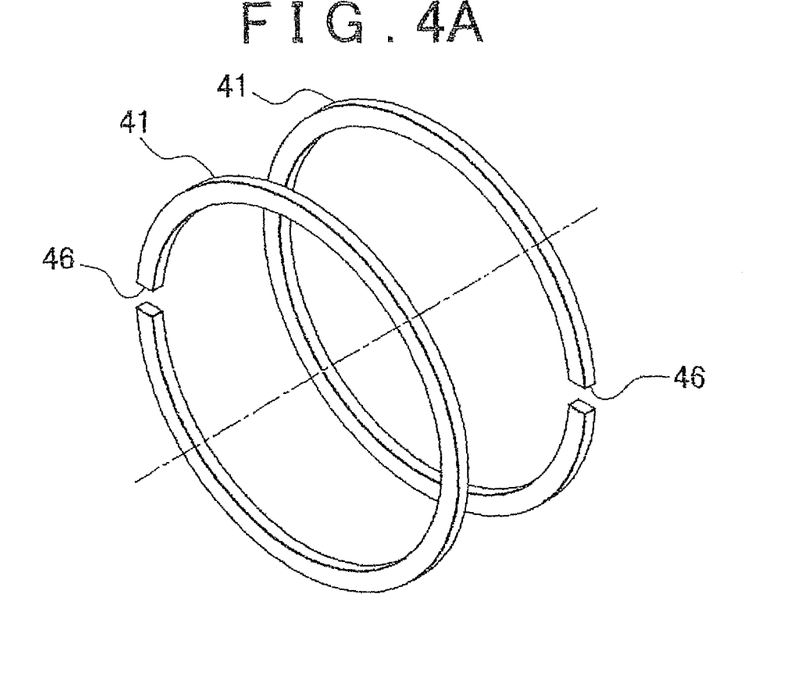
FIG. 4A and FIG. 4B illustrate a state that two rings are mounted in the groove.
Figure 4B:
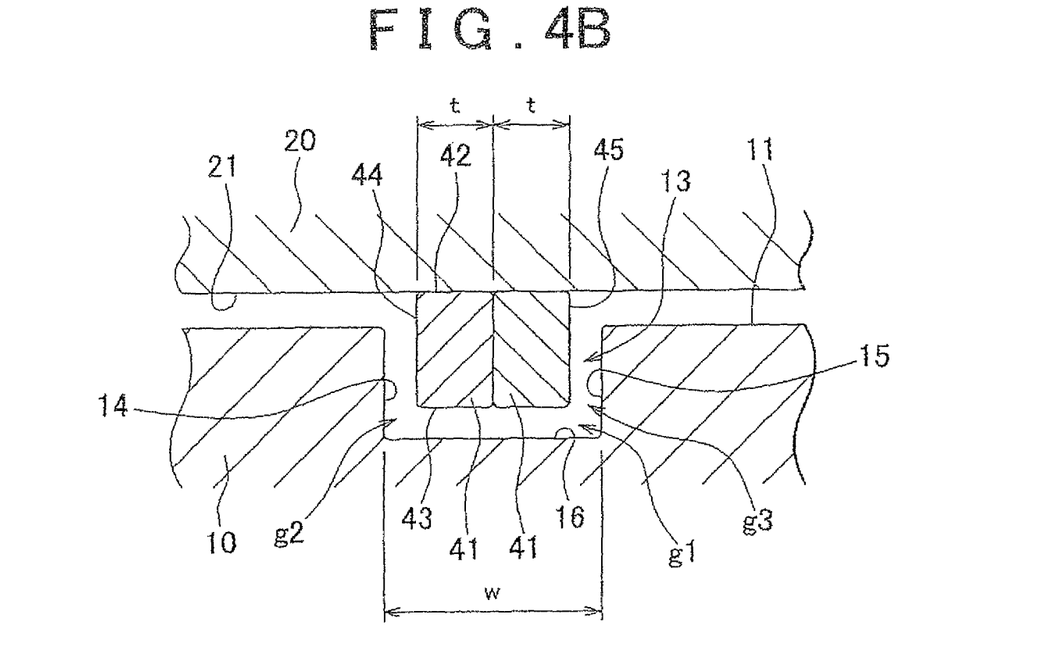

Although an embodiment is described with reference to FIG. 3 such that a single ring 41 is disposed to the groove 13, the present invention may include multiple rings 41. FIGS. 4A and 4B show a second embodiment that includes multiple rings 41. In FIGS. 4A and 4B, two rings 41 are both disposed inside the groove 13 in an axially aligned manner. As described above, when multiple rings 41 are provided, each ring 41 is a C-shaped ring that a part of the circumference is separated as shown in FIG. 4A, and the C-shaped rings 41 and 41 have different circumferential positions of the separating portions (absent portions) 46 in a fitting state to the groove 13. In other words, as shown in FIG. 4A, the rings 41 and 41 are mounted in the groove such that the separating portions 46 and 46 of the two rings 41 and 41 are offset by 180 degrees.

According to the structure as shown in FIGS. 4A and 4B, the C-shaped ring 41 is employed, and therefore the separating portion 46 is provided in a part of the circumference of the ring 41. Although obstacles such as mud may pass through the separating portion 46, this embodiment includes multiple rings 41 in the axial direction, and the circumferential positions of the separating portions 46 are different from each other. Therefore, the rings 41 and 41 are capable of blocking the passage of the obstacles. In this embodiment, the width dimension w of the groove 13 and the thickness t of the ring 41 is set to have a relationship (w>2×t) so that gaps are formed between the rings 41 and 41 and the groove 13.

Figure 5:
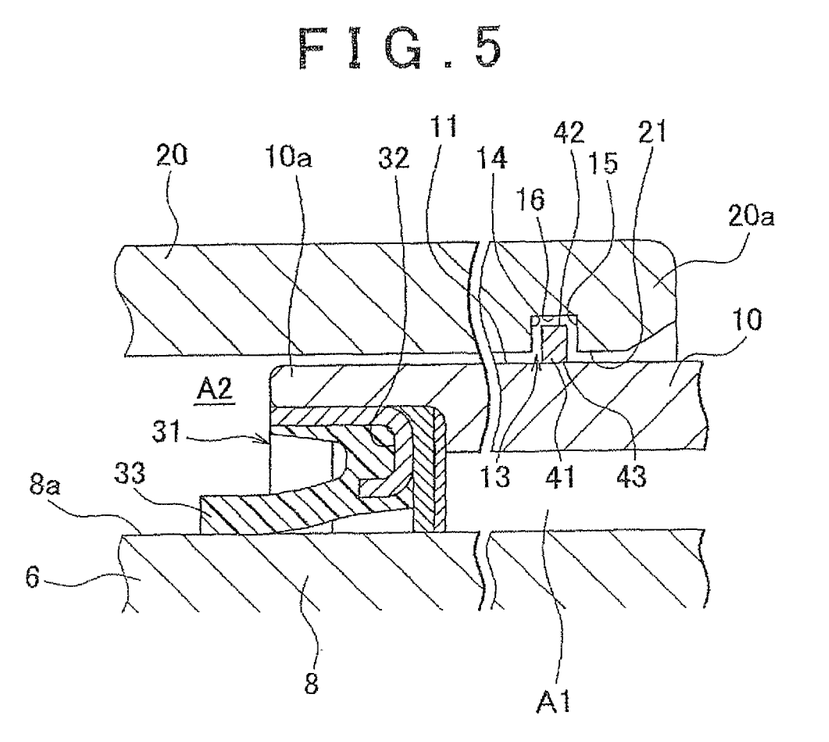
FIG. 5 is an enlarged cross-sectional view illustrating a part of the torque transmission device according to the second embodiment of the present invention.

In the torque transmission device according to the present invention, the groove 13 may be formed in one side of the outer peripheral surface 11 of the first cover 10 and the inner peripheral surface 21 of the second cover 20, and the ring 41 may be slidable on the other side of the outer peripheral surface 11 of the first cover 10 and the inner peripheral surface 21 of the second cover 20. As shown in FIG. 5, the groove 13 may be formed in the inner peripheral surface 21 of the second cover 20, and the ring 41 mounted in the groove 13 may be slidable on the outer peripheral surface 11 of the first cover 10. In other words, as compared to the embodiment shown in FIG. 2, a forming surface of the groove 13 and a sliding surface of the ring 41 are inverted. Since the shaft 1 and the sleeve 6 relatively move in the axial direction, the groove 13 shown in FIG. 2 is formed on the side of the tip 10a of the first cover 10 (left side of FIG. 1), but the groove 13 shown in FIG. 5 is required to be formed on the side of the tip 20a of the second cover 20.

In the embodiment shown in FIG. 5, the ring 41 is arranged between side surfaces 14 and 15 that are located on both sides in the axial direction of the groove 13 that is formed in the second cover 20. However, the ring 41 is not fully fixed in position to the second cover 20 and is movable inside the groove 13 in the axial direction. An inner peripheral surface 43 of the ring 41 closely contacts an outer peripheral surface 11 of the first cover 10. That is, the ring 41 is being urged against the outer peripheral surface 11 of the first cover 10. Therefore, when the shaft 1 and the sleeve 6 relatively move in the axial direction, the first cover 10 and the second cover 20 relatively move in the axial direction also, and thus the ring 41 fitted inside the groove 13 formed in the second cover 20 is pushed to one of the side surfaces 14 and 15 of the groove 13 and is slidable on the outer peripheral surface 11 of the first cover 10.

By such the ring 41 and the groove 13, a labyrinth seal is constructed between the outer peripheral surface 11 of the first cover 10 and the inner peripheral surface 21 of the second cover 20 and therefore is capable of preventing the entry of obstacles from an opening of a tip 20a of the second cover 20 to the seal 31. The ring 41 mounted in the groove 13 may be slidable on the outer peripheral surface 11 of the first cover 10 and therefore may not interrupt the relative axial movement between the first cover 10 and the second cover 20 or the relative axial movement between the shaft 1 and the sleeve 6.

Furthermore, in this embodiment, the axial thickness of the ring 41 is set to be smaller than a width dimension of the groove 13. The ring 41 has a gap on the bottom surface 16 of the groove 13 and is disposed between the side surfaces 14 and 15 of the groove 13. Therefore, the gap can be formed between an outer peripheral surface 42 of the ring 41 and the bottom surface 16 of the groove 13, and gaps can also be formed between side surfaces 44 and 45 of the ring 41 and the side surfaces 14 and 15 of the groove 13, respectively. Air can pass through the gaps. Accordingly, when the shaft 1 and the sleeve 6 relatively move in the axial direction, negative pressure, which can be produced in the related art, is not produced inside. That is, in this embodiment, the labyrinth seal formed by the ring 41 and groove 13 can permit the passage of air but regulate the passage of obstacles such as mud between the first cover 10 and the second cover 20.

In each embodiment described above, the labyrinth seal formed between the groove 13 and the ring 41 is constructed with the gaps g2 and g3 respectively formed between the side surfaces 14 and 15 of the groove 13 and the side surfaces 44 and 45 of the ring 41, and the gap g1 formed between the bottom surface 16 of the groove 13 and the inner peripheral surface 43 of the ring 41. In this case, the gaps g1, g2, and g3 can prevent the entry of obstacles. Furthermore, the gaps g2 and g3 are formed as described above, and the gap between the bottom surface 16 of the groove 13 and the inner peripheral surface 43 of the ring 41 may be formed largely. In this case, the gaps g2 and g3 can prevent the entry of obstacles. In addition, the gap g1 is formed as described above, and the respective gaps between the side surfaces 14 and 15 of the groove 13 and the side surfaces 44 and 45 of the ring 41 may be formed largely. In this case, the gap g1 can prevent the entry of obstacles.

The torque transmission device according to the present invention is not limited to the embodiments illustrated in the drawings and may be embodied in other forms within the scope of the present invention. For example, the seal 31 may be in other forms. In the embodiments described above, the torque transmission device is described as a joint of the propeller shaft provided in the vehicle; however, the device is not limited to the above and may be applied to a joint of a drive shaft provided in industrial machineries.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A torque transmission device comprising:
    a shaft that has a male spline on a part of an outer periphery thereof;
    a sleeve that has a female spline fitted to the male spline on a part of an inner periphery thereof and that is incapable of relative rotation about the shaft and capable of relative movement in an axial direction;
    a first cover that has a cylindrical shape and that is attached to the shaft and covers an outer periphery of the sleeve;
    a second cover that has a cylindrical shape and that is attached to the sleeve and covers an outer periphery of the first cover;
    a seal that fills an annular space between the first cover and the sleeve; and
    a ring that is installed in a circumferentially continuous groove formed in one of an outer peripheral surface of the first cover and an inner peripheral surface of the second cover, and that is slidable on the other one of the outer peripheral surface of the first cover and the inner peripheral surface of the second cover,
    wherein a labyrinth seal is constructed between the ring and the groove.

2. The torque transmission device according to claim 1, wherein the ring is a C-shaped ring in which a part of a circumference is separated.

3. The torque transmission device according to claim 2, wherein multiple C-shaped rings are provided in the groove in the axial direction, and circumferential positions of separating portions of the C-shaped rings are different from each other.

4. The torque transmission device according to claim 1, wherein:
    the groove is formed in the outer peripheral surface of the first cover;
    an outer peripheral surface of the ring contacts the inner peripheral surface of the second cover; and
    a gap is formed between an inner peripheral surface of the ring and a bottom surface of the groove.

5. The torque transmission device according to claim 4, wherein the gap is smaller than a gap that is formed between the outer peripheral surface of the first cover and the inner peripheral surface of the second cover.

6. The torque transmission device according to claim 1, wherein:
    the groove is formed in the inner peripheral surface of the second cover;
    the inner peripheral surface of the ring contacts the outer peripheral surface of the first cover; and
    a gap is formed between the outer peripheral surface of the ring and a bottom surface of the groove.

7. The torque transmission device according to claim 6, wherein the gap is smaller than a gap that is formed between the outer peripheral surface of the first cover and the inner peripheral surface of the second cover.

8. The torque transmission device according to claim 1, wherein an axial width of the groove is larger than a thickness of the ring.

9. The torque transmission device according to claim 8, wherein a difference between the axial width of the groove and the thickness of the ring is smaller than a gap that is formed between the outer peripheral surface of the first cover and the inner peripheral surface of the second cover.

10. The torque transmission device according to claim 1, wherein a mechanism that reduces airtightness is provided in at least one of a side surface of the groove and a side surface of the ring.

11. The torque transmission device according to claim 10, wherein the mechanism is provided through rough surface processing.

12. The torque transmission device according to claim 10, wherein:
    the ring is a C-shaped ring that a part of a circumference is separated; and
    the mechanism is formed by misalignment of separating portions of the ring in the axial direction.

* * * * *